Figure 1:
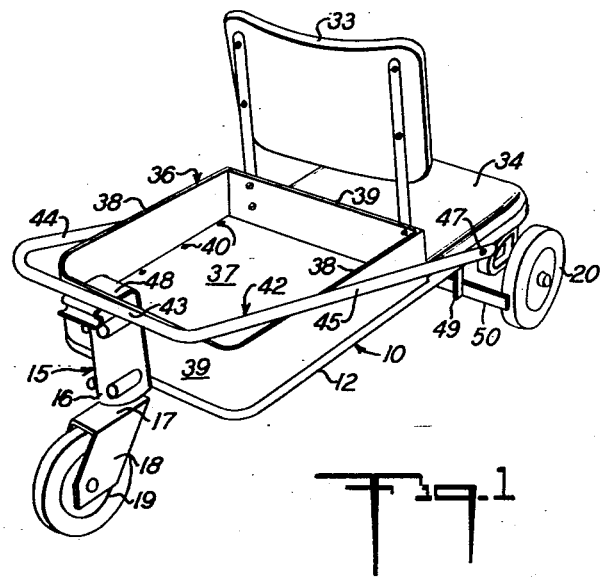

June 18, 1957  C. T. CABLER  2,796,155
VEHICLE FOR FACILITATING GARDEN WORK
Filed July 10, 1953  2 Sheets-Sheet 1

INVENTOR
CHARLES T. CABLER
BY Donald G. Eaton
AGENT

June 18, 1957 C. T. CABLER 2,796,155
VEHICLE FOR FACILITATING GARDEN WORK
Filed July 10, 1953 2 Sheets-Sheet 2
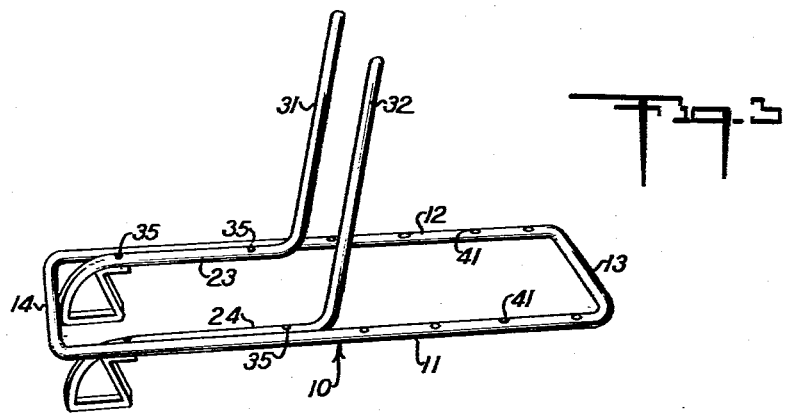
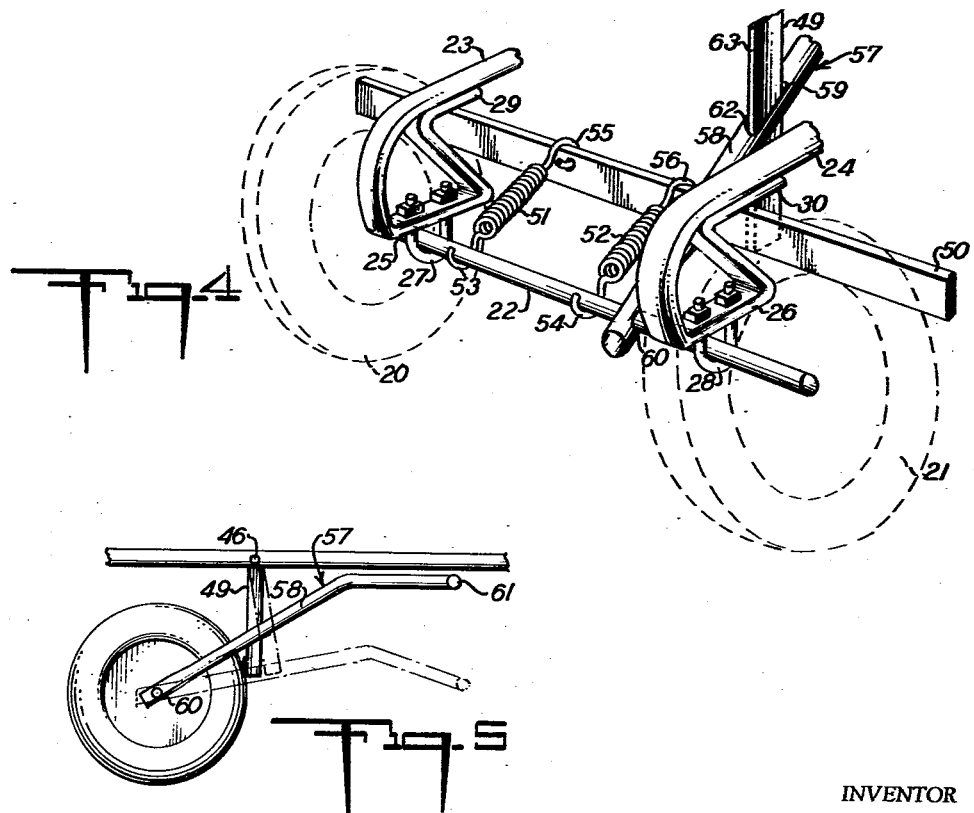
INVENTOR
CHARLES T. CABLER
BY Donald G. Eaton
AGENT

United States Patent Office 2,796,155
Patented June 18, 1957

2,796,155
VEHICLE FOR FACILITATING GARDEN WORK

Charles T. Cabler, Richmond, Va.

Application July 10, 1953, Serial No. 367,235

3 Claims. (Cl. 188—167)

This invention relates to transportation and more particularly to a vehicle specifically designed for facilitating garden work and the like while the person performing the same is seated in a comfortable and convenient position.

As is well known much garden work such as transplanting, weeding and similar operations requiring that the persons hands be in close proximity to the ground is extremely tiring as a result of the unnatural and awkward position required which situation often reduces such work to a drudgery when in reality if the person could be comfortable and work for appreciable periods of time without becoming unduly fatigued such work could well be a relaxing pastime.

Heretofore there have been numerous vehicles which might be utilized for applicant's purpose but these have largely been children's toy vehicles which were not specifically designed for the purpose and which were usually of such weak construction that use by an adult for any appreciable period of time would result in substantial destruction of the vehicle. Furthermore, these prior art devices were not provided with space for holding plants to be transplanted, garden tools of the hand variety or other implements or materials which might be required. Likewise, no means was provided for preventing inadvertent movement of the vehicle which sometimes resulted in damage to plants and the like since such inadvertent movement would not be controlled by the occupant who would be completely unaware that such movement was about to take place.

It is accordingly an object of the invention to provide a vehicle for facilitating garden work by a person seated thereon which vehicle is of light weight, economical construction and which will provide a convenient comfortable seat for a person and permit movement at will merely by pushing with the feet.

A further object of the invention is the provision of a vehicle for facilitating garden work by a person seated thereon which vehicle is provided with parking brake means which may be applied or released at will and when applied serves to securely hold the vehicle in a selected location.

A still further object of the invention is the provision of a vehicle for facilitating garden work by a person seated thereon which vehicle is provided with a body for carrying tools, plants or other desired implements or materials.

Another object of the invention is the provision of a vehicle for facilitating garden work by a person seated thereon which vehicle is provided with a handle bar for facilitating movement thereof from place to place and which handle bar is movable to an inoperative out of the way position when a person is seated in the vehicle.

Figure 2:
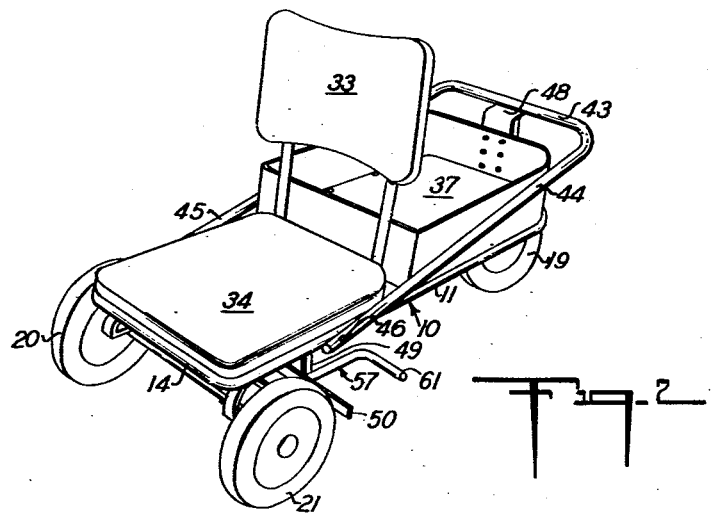

Further objects and advantages of the invention will be apparent from the following description taken in conjunction with the accompanying drawing wherein:

Fig. 1 is a front perspective view showing a vehicle constructed in accordance with this invention;

Fig. 2, a rear perspective view of the vehicle shown in Fig. 1;

Fig. 3, a fragmentary perspective view showing the chassis and the axle engaging and seat supporting framework;

Fig. 4, a fragmentary perspective view showing the running gear and brake mechanism with the ground engaging wheels shown in dotted outline; and Fig. 5, a fragmentary elevational view showing the brake mechanism in applied and released position.

With continued reference to the drawing there is shown a chassis 10 which may be formed of tubular lightweight material such as aluminum, magnesium or the like, which chassis comprises side bars 11 and 12, a rear cross bar 13 and a front cross bar 14. The chassis 10 may be formed of a single piece of tubular material welded together at the ends or may be fabricated from a plurality of individual pieces. Obviously if desired the chassis 10 may be constructed of solid bar stock but obviously such construction would materially increase the weight and cost and consequently tubular construction is preferred.

Secured to the rear cross bar 13 of the chassis 10 by welding or the like is a rear caster wheel 15 which may include a vertical bearing 16 for rotatably receiving a pin secured to a U-shaped bracket 17 between the ears 18 of which a wheel 19 is rotatably mounted.

A running gear is provided for the forward portion of the vehicle and this may well comprise ground engaging wheels 20 and 21 rotatably mounted on an axle 22 extending transversely of the chassis 10. Secured to the axle 22 inwardly of the wheels 20 and 21 are spaced chassis supporting frame members 23 and 24 which frame members may be of tubular construction and at the forward end thereof bent downwardly and rearwardly to form an axle engaging portion 25 and 26, these portions being secured to the axle 22 by U-bolts or the like 27 and 28. The axle engaging portions 25 and 26 may be bent upwardly and rearwardly with portions 29 and 30 underlying and secured to the frame members 23 and 24 by welding or the like in order to provide additional strength.

The frames 23 and 24 extend rearwardly of the chassis 10 within the side bars 11 and 12 and substantially in the plane thereof frame members 23 and 24 being secured to the side bars 12 and 11, respectively, by welding or any other suitable means. Frame members 23 and 24 at the rear ends thereof extend upwardly at a slight rearward inclination to provide arms 31 and 32 which serve as a support for a seat back 33 secured thereto in any convenient manner. A seat 34 may be secured to the frame members 23 and 24 or to the chassis side bars 11 and 12 by any suitable means such as screw threaded fastening means extending through apertures 35 in the frame members 23 and 24.

A load carrying body 36 having a bottom 37, upstanding side walls 38, and front and rear end walls 39, may be secured to the chassis 10 to the rear of seat back supporting arms 31 and 32 by any suitable means such as screw threaded fastening means 40 extending through apertures 41 provided in the side bars 11 and 12 of chassis 10. Body 36 may serve to carry plants to be transplanted, seeds, implements of any desired kind and, in fact, any objects or material which the person utilizing the vehicle may desire to have at hand for convenient use.

In order to conveniently move the vehicle of this invention from place to place when the same is not being utilized by a person seated thereon, a handle bar 42 may be provided which may be of U-shaped tubular construction having a cross bar 43 and substantially parallel side bars 44 and 45 which are pivotally secured at 46 and 47, respectively, to the side bars 11 and 12, respectively, of the chassis 10. In Figs. 1 and 2 the handle bar 42 is shown in inoperative position where it rests at a slight upward inclination on a bracket 48 secured to the caster wheel structure 15 and when it is desired to use the handle bar 42 for pulling the vehicle the same is pivoted about the pivotal mountings 46 and 47 to a position forwardly of the vehicle where it may be conveniently grasped to pull the same.

When using the vehicle of this invention it is highly desirable that the same remain in a selected location until work at that location is completed and since the vehicle may easily be moved by pressure of the feet of the person occupying the same upon the ground or by reason of the fact that the vehicle is situated on an incline means to maintain the vehicle in such position is provided in the form of a parking brake which may well comprise a pair of arms 49 pivotally mounted on pivots 46 and 47 which pivotally mount the handle bar 42, the arms 49 depending below the chassis 10. Secured to the lower ends of arms 49 and extending transversely of the chassis 10 is a brake beam 50, a portion of which at each end is adapted to engage the treads of wheels 20 and 21. In order to bias the brake beam 50 into firm engagement with the wheels 20 and 21 to lock the same against rotation, tension springs 51 and 52 may be secured at one end 53 and 54 to the axle 22 and at their opposite ends 55 and 56 to the brake beam 50. Obviously if desired only one spring need be employed but since the two spaced springs as shown provide a more balanced operation such structure is considered preferable.

In order to release the parking brake by moving the brake beam 50 away from the wheels 20 and 21 an actuating lever 57 is provided which may be of tubular construction having a relatively straight portion 58 provided with an elongated slot 59 slidably receiving the depending arm 49, the portion 58 terminating at its forward end in an aperture 60 which serves to pivotally mount the same on the axle 22. The opposite end of actuating lever 57 is provided with an angularly disposed hand engaging portion 61 which may extend outwardly to one side of the chassis 10 immediately below the seat 34 where the same may be conveniently grasped by the hand of the occupant.

The operation of the parking brake means is best shown in Figs. 4 and 5 and with the actuating lever 57 in uppermost position as shown in full lines in Fig. 5 the brake beam 50 will be biased into engagement with the wheels 20 and 21 by the action of tension springs 51 and 52 to firmly lock the wheels 20 and 21 against rotation and thus maintain the vehicle in any desired location. When it is desired to release the parking brake by moving the brake beam 50 rearwardly away from the wheels 20 and 21 it is only necessary for the occupant to grasp the hand portion 61 and move the actuating lever 57 downwardly to the dotted line position shown in Fig. 5 at which time the end 62 of the slot 59 will engage the forward edge 63 of the arm 49 to cam the same rearwardly and move the brake beam 50 away from the wheels 20 and 21. Since the actuating lever 57 when in the downward dotted line position is on dead center the brake beam 50 will be retained in its inoperative position until such time as the actuating lever 57 is manually moved upwardly to permit reengagement of the brake beam 50 with the wheels 20 and 21.

It will be seen that by the above described invention there has been provided a very simple, lightweight and relatively inexpensive vehicle which may serve as a support for a person engaged in garden work or the like which person will be in close proximity to the ground and in a position to conveniently and comfortably carry out such operations as may be desired, the vehicle being movable and steerable to any desired location merely by the occupant exerting pressure upon the ground through his or her feet. Furthermore, very simple, yet highly efficient braking means is provided to maintain the vehicle in any desired location and a load carrying body is included for transporting and supporting for convenient use any desired objects or materials. The vehicle of this invention is relatively small and occupies little space when not in use and the same is of such lightweight construction that it may be conveniently transported from place to place with little manual effort.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. For use in a vehicle, running gear and brake structure comprising an axle, ground engaging wheels rotatably mounted on said axle adjacent the ends thereof, spaced vehicle supporting frame members secured to said axle inwardly of said wheels, parking brake means comprising a pair of arms pivotally mounted on said frame members and depending therefrom, a brake beam secured to said arms and extending substantially parallel to said axle for movement into and out of engagement with said wheels, tension springs connected between said axle and said brake beam for biasing said brake beam into engagement with said wheels and brake actuating means comprising a lever pivotally mounted on said axle, a slot in said lever slidably receiving one of said arms and a hand engaging portion on said lever whereby upon downward movement of said lever one end of said slot will engage said arm and cam said brake beam away from said wheels, continued downward movement of said lever moving the same to a dead center position to hold said brake beam in inoperative position and upon upward movement of said lever said springs will move said brake beam into engagement with said wheels to lock the same against rotation.

2. For use in a vehicle, running gear and brake structure comprising an axle, ground engaging wheels rotatably mounted on said axle, spaced vehicle supporting frame members secured to said axle, parking brake means comprising a pair of arms pivotally mounted on said frame members and depending therefrom, a brake beam secured to said arms and extending substantially parallel to said axle for movement into and out of engagement with said wheels, tension springs connected between said axle and said brake beam for biasing said brake beam into engagement with said wheels and brake actuating means comprising a lever pivotally mounted on said axle, a slot in said lever slidably receiving one of said arms and a hand engaging portion on said lever whereby upon downward movement of said lever one end of said slot will engage said arm and cam said brake beam away from said wheels, continued downward movement of said lever moving the same to a dead center position to hold said brake beam in inoperative position and upon upward movement of said lever said springs will move said brake beam into engagement with said wheels to lock the same against rotation.

3. For use in a vehicle, running gear and brake structure comprising an axle, ground engaging wheels rotatably mounted on said axle, spaced vehicle supporting frame members secured to said axle, parking brake means comprising a pair of arms pivotally mounted on said frame members and depending therefrom, a brake beam secured to said arms and extending substantially parallel to said axle for movement into and out of engagement with said wheels, resilient means for biasing said brake beam into engagement with said wheels and brake actuating means comprising a lever pivotally mounted on said axle, a slot in said lever slidably receiving one of said arms and a hand engaging portion on said lever whereby upon downward movement of said lever one end of said slot will engage said arm and cam said brake beam away from said wheels, continued downward movement of said lever moving the same to a dead center position to hold said brake beam in inoperative position and upon upward movement of said lever said resilient means will move said brake beam into engagement with said wheels to lock the same against rotation.

References Cited in the file of this patent

UNITED STATES PATENTS

| | | |
|---|---|---|
| 205,872 | Kirby | July 9, 1878 |
| 238,223 | Fogg | Mar. 1, 1881 |
| 1,559,796 | Shuey et al. | Nov. 3, 1925 |
| 1,867,078 | Kazenmaier | July 12, 1932 |
| 2,420,088 | Milburn | May 6, 1947 |
| 2,430,629 | Bigus | Nov. 11, 1947 |
| 2,443,236 | Gallagher | June 15, 1948 |

FOREIGN PATENTS

| | | |
|---|---|---|
| 417,907 | Germany | Sept. 14, 1925 |